US011619928B1

(12) United States Patent
Shao et al.

(10) Patent No.: US 11,619,928 B1
(45) Date of Patent: Apr. 4, 2023

(54) INDUSTRIAL INTERNET OF THINGS SYSTEM FOR SMART MANUFACTURING AND CONTROL METHOD THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yong Li, Chengdu (CN); Yaqiang Quan, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/807,720

(22) Filed: Jun. 19, 2022

(30) Foreign Application Priority Data

Apr. 28, 2022 (CN) .......................... 202210454373.0

(51) Int. Cl.
*G05B 19/41* (2006.01)
*H04L 67/12* (2022.01)
(Continued)

(52) U.S. Cl.
CPC ........ *G05B 19/41835* (2013.01); *H04L 67/12* (2013.01); *G05B 2219/31368* (2013.01); *G16Y 10/25* (2020.01); *G16Y 40/30* (2020.01)

(58) Field of Classification Search
None
See application file for complete search history.

(56) References Cited

U.S. PATENT DOCUMENTS

2016/0366536 A1* 12/2016 Agostinelli ............ G08C 17/02
2017/0300042 A1* 10/2017 Pauly ................. G05B 19/4186
(Continued)

FOREIGN PATENT DOCUMENTS

CN 102567611 A 7/2012
CN 103489053 A 1/2014
(Continued)

OTHER PUBLICATIONS

Yang et al., "Secure and Efficient kNN Classification for Industrial Internet of Things", 2020, IEEE Internet of Things Journal, vol. 7, No. 11, Nov. 2020 10945. (Year: 2020).*
(Continued)

*Primary Examiner* — Mohammad Ali
*Assistant Examiner* — Kelvin Booker
(74) *Attorney, Agent, or Firm* — Metis IP LLC

(57) ABSTRACT

The present disclosure disclosed an industrial internet of things (IIoT) system for smart manufacturing, comprising: a user platform, interacting with users; a service platform extracting information required by a user platform from a management platform, processing the information and sends the information to the user platform; a management platform controlling the operation of an object platform, and receiving feedback data from the object platform; a sensor network platform, configured to interact between the object platform and the management platform; the object platform, which is production line devices and production line sensors that perform manufacturing; wherein the service platform, the management platform, and the sensor network platform all use centralized layouts. The present disclosure also disclosed a control method of industrial internet of things (IIoT) for smart manufacturing. The present disclosure is suitable for smart manufacturing companies with relatively (Continued)

simple production lines and less complicated production processes.

8 Claims, 4 Drawing Sheets

(51) Int. Cl.
    *G16Y 40/30*     (2020.01)
    *G16Y 10/25*     (2020.01)
    *G05B 19/418*     (2006.01)

(56) References Cited

U.S. PATENT DOCUMENTS

| | | | |
|---|---|---|---|
| 2019/0273784 A1* | 9/2019 | Shao | H04L 67/562 |
| 2019/0324444 A1* | 10/2019 | Cella | G05B 19/4185 |
| 2019/0339688 A1* | 11/2019 | Cella | G05B 23/0229 |
| 2020/0133257 A1* | 4/2020 | Cella | H04B 17/318 |
| 2020/0225655 A1* | 7/2020 | Cella | G05B 23/024 |
| 2020/0247063 A1* | 8/2020 | Pinskiy | G06N 3/006 |
| 2020/0302187 A1* | 9/2020 | Wang | H04L 25/0224 |
| 2020/0321111 A1* | 10/2020 | Neumann | G16H 50/00 |
| 2020/0327372 A1* | 10/2020 | Anschuetz | G06K 9/628 |
| 2020/0371509 A1* | 11/2020 | Mark | G06N 3/08 |
| 2021/0157312 A1* | 5/2021 | Cella | G06V 10/82 |
| 2022/0108262 A1* | 4/2022 | Cella | G06Q 10/063118 |

FOREIGN PATENT DOCUMENTS

| | | |
|---|---|---|
| CN | 205750508 U | 11/2016 |
| CN | 110059738 A | 7/2019 |
| CN | 110601876 A | 12/2019 |
| CN | 111667375 A | 9/2020 |
| CN | 112165501 A | 1/2021 |
| CN | 112989980 A | 6/2021 |
| CN | 113141381 A | 7/2021 |
| WO | 2020138828 A2 | 7/2020 |

OTHER PUBLICATIONS

Hu et al., "A Survey on Industrial Internet of Things: A Cyber-Physical Systems Perspective", Oct. 2018, IEEE Access, Digital Object Identifier 10.1109/ACCESS.2018.2884906. (Year: 2018).*
Wang et al., "Random Forest-Bayesian Optimization for Product Quality Prediction With Large-Scale Dimensions in Process Industrial Cyber-Physical Systems", Sep. 2020, IEEE Internet of Things Journal, vol. 7, No. 9. (Year: 2020).*
Su et al., "Classification of Manufacturing Defects in Multicrystalline Solar Cells With Novel Feature Descriptor", Dec. 2019, IEEE Transactions on Instrumentation and Measurement, vol. 68, No. 12. (Year: 2019).*
Liu et al., "Semi-supervised anomaly detection with dual prototypes auto-encoder for industrial surface inspection", Mar. 2020, Optics and Lasers in Engineering 136 (2021) 106324. (Year: 2020).*
Lin et al., "Concept Drift Detection and Adaption in Big Imbalance Industrial IoT Data Using an Ensemble Learning Method of Offline Classifiers", Mar. 2019, IEEE Access, Digital Object Identifier 10.1109/ACCESS.2019.2912631. (Year: 2019).*
Bal et al., "A comparison of dimension reduction techniques for support vector machine modeling of multi-parameter manufacturing quality prediction", Jul. 2017, Journal of Intelligent Manufacturing (2019) 30:2245-2256. (Year: 2017).*
Shao, Zehua, Exploration and Research on the Structure of Internet of Things, Internet of Things Technologies Reliable Transmission, 2015, 10 pages.
Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.

* cited by examiner

300

> For each production link in the production cycle of the product, collecting production link data of the production link based on a first collection frequency, wherein the production link data includes product data of the production link, device operation parameters, and device monitoring data — 310

> Processing the production link data according to an abnormal determination model to determine whether a device corresponding to the production link is abnormal — 320

INDUSTRIAL INTERNET OF THINGS SYSTEM FOR SMART MANUFACTURING AND CONTROL METHOD THEREOF

CROSS-REFERENCE TO RELATED APPLICATIONS

This application claims priority of Chinese Patent Application No. CN202210454373.0, filed on Apr. 28, 2022, the entire contents of which are incorporated herein by reference.

TECHNICAL FIELD

The present disclosure involves smart manufacturing technology, and specifically involves an industrial internet of things (IIoT) system for smart manufacturing and control method thereof.

BACKGROUND

Intelligent manufacturing (IM, also referred to as smart manufacturing) is a human-machine integrated intelligent system composed of intelligent machines and human experts. Intelligent manufacturing can conduct intelligent activities in the process of manufacturing, such as analysis, reasoning, judgment, conception, and decision-making. Human-intelligent machines working cooperatively can amplify, extend, and partially replace the intellectual work of human experts in the manufacturing process. Intelligent manufacturing updates the concept of manufacturing automation to flexible, intelligent, and highly integrated.

The existing technology research on intelligent manufacturing technology mainly stays in the research of a single project, such as the control of a certain product production line or production node, which lacks universal applicability and easily leads to repeated development.

SUMMARY

The technical problem to be solved by the present disclosure is that the research of existing technology for intelligent manufacturing is based on specific product production lines or production nodes and lacks universal applicability. The purpose of the present disclosure is to provide an industrial internet of things (IIoT) system for smart manufacturing and control method thereof to solve the above problems.

The present disclosure is implemented through the following technical solution:

In One Aspect:

An industrial internet of things (IIoT) system for smart manufacturing, comprising: a user platform, a service platform, a management platform, a sensor network platform, and an object platform that interact in turn; wherein the user platform is configured as a terminal device, and interacts with a user;

the service platform is configured as a first server, receives instructions from the user platform and sends the instructions to the management platform, extracts information required by the user platform from the management platform, processes the information, and sends the information to the user platform;

the management platform is configured as a second server, controls the operation of the object platform, and receives feedback data from the object platform;

the sensor network platform is configured as a communication network and a gateway, through which the object platform and the management platform interact;

the object platform is configured as production line devices and production line sensors that perform manufacturing; wherein the service platform, the management platform, and the sensor network platform all use centralized layouts, the centralized layouts mean that any platform uniformly receives data, uniformly processes data, and uniformly sends data;

when the terminal device modifies production line parameters based on instructions of the users, the terminal device generates a first instruction and sends the first instruction to the first server;

the first server processes the first instruction to generate a second instruction and sends the second instruction to the second server, the second instruction being used to be identified by the second server;

the second server modifies work order parameters stored in the second server based on the second instruction, and generates a third instruction based on the modified work order parameters; and when the second server sends the third instruction to the object platform through the sensor network platform, the object platform executes manufacturing and collects production line data based on the third instruction.

Further, the object platform sends the collected production line data to the second server through the sensor network platform to form a production line database;

the first server extracts corresponding data from the production line database and sends it to the terminal device according to a preset rule or a request of the terminal device;

the terminal device displays received data to the user.

Further, the second server traverses the production line database in a production process of the object platform, and extracts data of each production link during the production of each product from the production line database as production cycle data of the each product;

the second server establishes a mapping relationship between the production cycle data of the each product and a qualification condition of the each product to form sample data;

the second server uses a support vector machine to classify the sample data to generate a binary classifier; input data of the binary classifier is the production cycle data, and output data of the binary classifier is whether the product is qualified;

when a production cycle of a new product is completed, the second server inputs production cycle data of the new product into the binary classifier, and determines whether the new product is qualified based on an output result of the binary classifier.

Further, the work order parameters are stored in the second server in the form of a parameter table; the parameter table represents corresponding relationships between parameter names and parameter values; the parameter table is configured with correlation relationships between parameters;

when receiving the second instruction, the second server extracts a parameter name of a parameter that needs to be modified from the second instruction, and traverses and retrieves all parameters having the correlation relationships with the parameter from the parameter table according to the parameter name to form an association parameter set;

the second server modifies a parameter in the association parameter set according to a parameter value corresponding to the parameter name in the second instruction, and detects whether a parameter in the association parameter set exceeds a corresponding preset value;

if any parameter in the association parameter set is not within a range of the corresponding preset value, the second server rejects the parameter modification and rolls back a parameter value of any parameter not within the range of the corresponding preset value;

the second server feeds back information data to the terminal device through the first server after rejecting this parameter modification.

Further, if any parameter in the association parameter set is within the range of the corresponding preset value, the second server modifies the parameter table according to the association parameter set, generates a configuration file, and sends the configuration file to the object platform through the sensor network platform.

Further, for each production link in a production cycle of the product, the object platform is also configured to:

collect production link data of the production link based on a first collection frequency, wherein the production link data includes product data of the production link, device operation parameters, and device monitoring data;

the second server is also configured to:

process the production link data according to an abnormal determination model to determine whether a device corresponding to the production link is abnormal.

Further, the abnormal determination model includes a production feature extraction layer and an abnormal device determination layer connected in turn and the second server is also configured to:

process a production link data sequence through the production feature extraction layer to determine a production feature vector of the device corresponding to the production link, and the production link data sequence includes the production link data at multiple time points; and process the production feature vector through the abnormal device determination layer to obtain a judgment conclusion of whether the device corresponding to the production link is abnormal.

Further, the judgment conclusion includes a judgment result of whether the device corresponding to the production link is abnormal and a confidence level of the judgment result, and when the confidence level is less than a threshold, the second server is also configured to:

adjust the first collection frequency of the object platform to a second collection frequency, and the second collection frequency is higher than the first collection frequency.

In One Aspect:

A control method of industrial internet of things (IIoT) for smart manufacturing, which is applied to a user platform, a service platform, a management platform, a sensor network platform, and an object platform that interact in turn; wherein the user platform is configured as a terminal device, and interacts with a user;

the service platform is configured as a first server, receives instructions from the user platform and sends the instructions to the management platform, extracts information required by the user platform from the management platform, processes the information, and sends the information to the user platform;

the management platform is configured as a second server, control the operation of the object platform, and receives feedback data from the object platform;

the sensor network platform is configured as a communication network and a gateway, through which the object platform and the management platform interact;

the object platform is configured as production line device and production line sensors that perform manufacturing; wherein the service platform, the management platform, and the sensor network platform all use centralized layouts; the centralized layouts mean that any platform uniformly receives data, uniformly processes data, and uniformly sends data;

the method comprising:

when the terminal device modifies production line parameters based on instructions of the user, generating, by the terminal device, the first instruction and sending the first instruction to the first server;

processing the first instruction to generate a second instruction and sending the second instruction to the second server by the first server, the second instruction being used to be identified by the second server;

modifying work order parameters stored in the second server based on the second instruction, and generating a third instruction based on the modified work order parameters by the second server; and when the second server sends the third instruction to the object platform through the sensor network platform, executing manufacturing and collecting production line data based on the third instruction by the object platform.

Further, the method includes:

sending, by the object platform, the collected production line data to the second server through the sensor network platform to form a production line database;

extracting corresponding data from the production line database and sending it to the terminal device according to a preset rule or a request of the terminal device by the first server; and displaying the received data to the user by the terminal device.

Further, the method includes:

traversing the production line database in a production process of the object platform, and extracting data of each production link during the production of each product from the production line database as production cycle data of the each product by the second server;

establishing a mapping relationship between the production cycle data of the each product and a qualification condition of the each product to form sample data by the second server;

using, by the second server, a support vector machine to classify the sample data to generate a binary classifier; input data of the binary classifier is the production cycle data, and output data of the binary classifier is whether the product is qualified;

when a production cycle of a new product is completed, inputting the production cycle data of the new product into the binary classifier, and determining whether the new product is qualified based on an output result of the binary classifier by the second server.

Further, the work order parameters are stored in the second server in the form of a parameter table; the parameter table represents corresponding relationships between parameter names and parameter values; the parameter table is configured with correlation relationships between parameters;

modifying work order parameters stored in the second server based on the second instruction by the second server includes:

when receiving the second instruction, extracting a parameter name of a parameter that needs to be modified from the second instruction, and traversing and retrieving all parameters having the correlation relationships with the parameter from the parameter table according to the parameter name to form an association parameter set by the second server;

modifying a parameter in the association parameter set according to a parameter value corresponding to the parameter name in the second instruction, and detecting whether a parameter in the association parameter set exceeds a corresponding preset value by the second server;

if any parameter in the association parameter set is not within a range of the corresponding preset value, rejecting the parameter modification and rolls back a parameter value of any parameter not within the range of the corresponding preset value by the second server;

feeding back information data to the terminal device through the first server after rejecting this parameter modification by the second server.

Further, modifying work order parameters stored in the second server based on the second instruction by the second server further includes:

if any parameter in the association parameter set is within the range of the corresponding preset value, modifying the parameter table according to the association parameter set, generating a configuration file, and sending the configuration file to the object platform through the sensor network platform by the second server.

Further, the method also comprises:

for each production link in a production cycle of the product, collecting production link data of the production link based on a first collection frequency by the object platform, wherein the production link data includes product data of the production link, device operation parameters, and device monitoring data; and processing the production link data according to an abnormal determination model to determine whether a device corresponding to the production link is abnormal by the second server.

Further, the abnormal determination model includes a production feature extraction layer and an abnormal device determination layer connected in turn, and processing the production link data according to the abnormal determination model to determine whether the device corresponding to the production link is abnormal by the second server includes:

processing a production link data sequence through the production feature extraction layer to determine a production feature vector of the device corresponding to the production link, and the production link data sequence includes the production link data at multiple time points; and processing the production feature vector through the abnormal device determination layer to obtain a judgment conclusion of whether the device corresponding to the production link is abnormal.

Further, the judgment conclusion includes a judgment result of whether the device corresponding to the production link is abnormal and a confidence level of the judgment result, and the control method further comprises:

when the confidence level is less than a threshold, adjusting the first collection frequency of the object platform to a second collection frequency by the second server, and the second collection frequency is higher than the first collection frequency.

In One Aspect:

A computer-readable storage medium storing computer instructions, wherein when reading the computer instructions in the storage medium, a computer implements the control method of industrial internet of things (IIoT) for smart manufacturing according to the aforementioned.

Compared with the existing technology, the present disclosure has the following advantages and beneficial effects.

The present disclosure provides an industrial internet of things (IIoT) system for smart manufacturing and control method thereof, which uses the form of the five-platform structure proposed by the inventor to build the industrial internet of things for smart manufacturing. Each platform has corresponding hardware device. The service platform, management platform, and sensor network platforms all use centralized layouts, so the present disclosure is very suitable for smart manufacturing companies with relatively simple production lines and less complicated production processes. Servers corresponding to the service platform and the management platform can centrally process all data content on the entire production lines. The sensor network platform can also transmit data in a unified manner, with a simple structure, which can be applied to a large class of smart manufacturing production lines, and has strong applicability.

BRIEF DESCRIPTION OF THE DRAWINGS

The drawings described here are used to provide a further understanding of the embodiments of the present disclosure, constitute a part of the present disclosure, and do not constitute limitations to the embodiments of the present disclosure. In the drawings:

FIG. 3 is a flowchart illustrating an exemplary process for determining whether a device is abnormal according to some embodiments of the present disclosure;

DETAILED DESCRIPTION

In order to make the purpose, technical solution, and advantages of the present disclosure clearer, the present disclosure will be further described in detail below with reference to the embodiments and the attached figures. The exemplary embodiments and descriptions of the present disclosure are only used to explain the present disclosure, but not to limit the present disclosure. The terminology used herein is for the purposes of describing particular examples and embodiments only and is not intended to be limiting. As used herein, the singular forms "a," "an," and "the" may be intended to include the plural forms as well, unless the context clearly indicates otherwise; and the plural forms may be intended to include the singular forms as well, unless the context clearly indicates otherwise.

Embodiments

Figure 1:
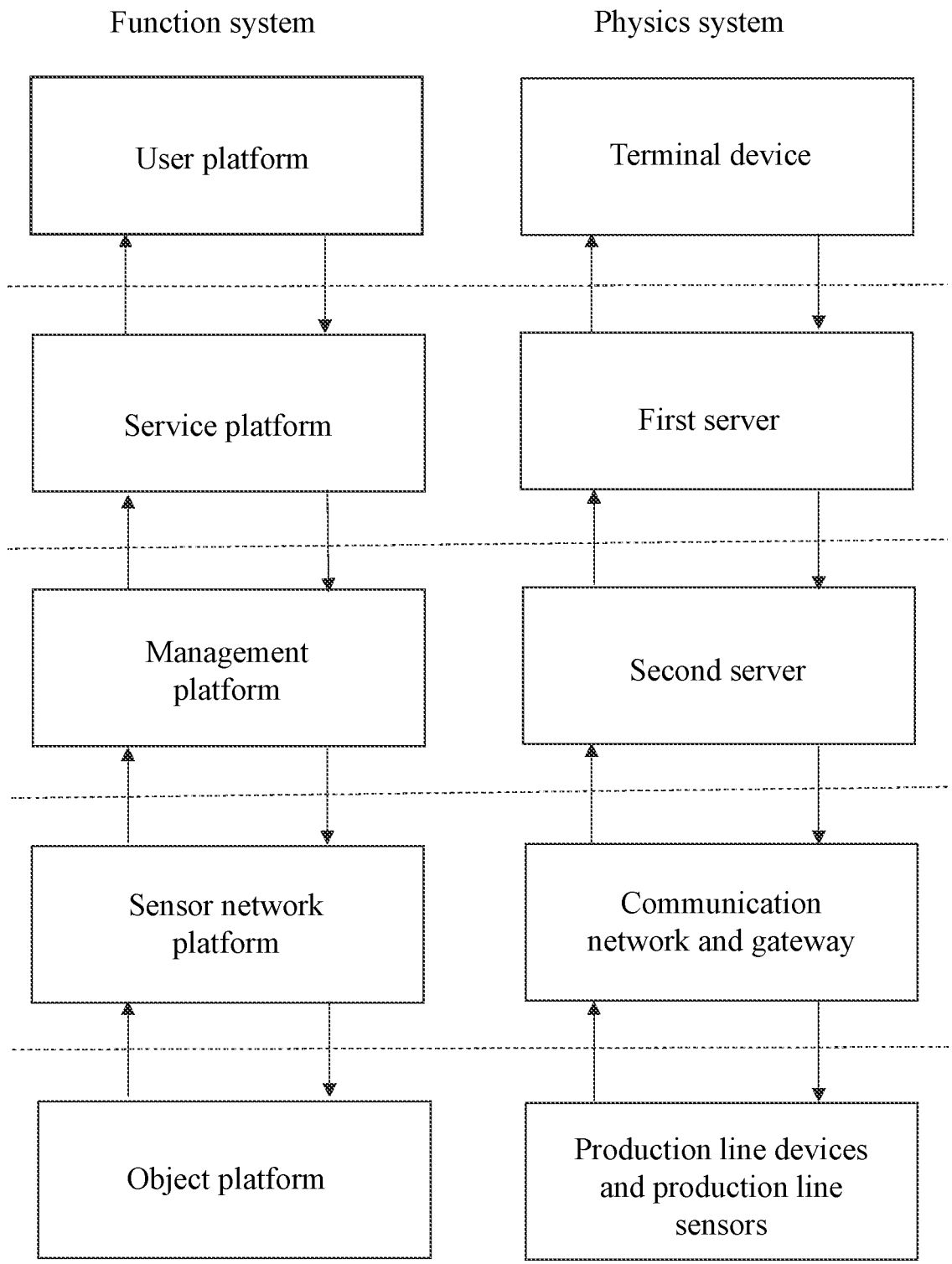
FIG. 1 is a schematic diagram illustrating an exemplary industrial internet of things (IIoT) architecture for smart manufacturing according to some embodiments of the present disclosure.

In order to facilitate the explanation of the above-mentioned industrial internet of things (IIoT) system for smart manufacturing, please refer to FIG. 1 to provide a schematic diagram of a communication architecture of an industrial internet of things (IIoT) system for smart manufacturing disclosed in embodiments of the present disclosure. The industrial internet of things (IIoT) system for smart manufacturing may include a user platform, a service platform, a management platform, a sensor network platform, and an object platform that interact in turn. The user platform, the service platform, the management platform, the sensor network platform, and the object platform are communicated and connected in turn.

The user platform is configured as a terminal device, and interacts with users.

The service platform is configured as a first server, receives instructions from the user platform and sends the instructions to the management platform, extracts and processes information required by the user platform from the management platform, and sends the information to the user platform.

The management platform is configured as a second server, controls the operation of the object platform, and receives feedback data from the object platform.

The sensor network platform is configured as a communication network and a gateway, through which the object platform and the management platform interact.

The object platform is configured as production line devices and production line sensors that perform manufacturing.

The service platform, the management platform, and the sensor network platform all use centralized layouts; the centralized layouts mean that any platform uniformly receives data, uniformly processes data, and uniformly sends data;

when the terminal device modifies production line parameters based on instructions of the users, generating the first instruction and sending the first instruction to the first server;

the first server processes the first instruction to generate a second instruction and send the second instruction to the second server, the second instruction is used to be identified by the second server;

the second server modifies work order parameters stored in the second server based on the second instruction, and generates a third instruction based on the modified work order parameters; and when the second server sends the third instruction to the object platform through the sensor network platform, the object platform executes manufacturing and collects production line data based on the third instruction.

In specific embodiments, the user platform may be a desktop, a tablet computer, a laptop computer, a mobile phone, or other electronic devices capable of data processing and data communication, which is not limited here.

In specific embodiments, the first server and the second server may be a single server or a server cluster, which is not limited here. It should be understood that the data processing process mentioned in some embodiments of the present disclosure can be processed by the processor of the server, and the data stored in the server can be stored in the storage device of the server, such as a hard disk and other memory.

In the existing technology, if a person wants to achieve smart manufacturing for small-scale production lines, he/she needs to introduce a series of systems such as PLM, CRM, ERP, MES, WMS, SCADA, WCS, etc., so as to realize data monitoring, automatic control, etc. For the series process, the expenditure cost details are too high for enterprises with smaller production scales.

In the implementation of this embodiment, the form of the five-platform structure proposed by the inventor is used to build the industrial Internet of Things (IIoT) for smart manufacturing wherein each platform has corresponding hardware device. The service platform, management platform, and sensor network platforms all use centralized layouts, so the present disclosure is very suitable for smart manufacturing companies with relatively simple production lines and less complicated production processes. Servers corresponding to the service platform and the management platform can centrally process all data content on the entire production line. The sensor network platform can also transmit data in a unified manner, with a simple structure, which can be applied to a large class of smart manufacturing production lines, with strong applicability.

In this embodiment, a complete set of instruction transmission processes from the terminal device to the production line device is formed.

The terminal device is used as the hardware of the user platform to log the user instruction and generate the first instruction, and the first server is used to process the first instruction to generate an instruction that can be directly identified by the second server. The processing mentioned here includes classification, unified transcoding, unified protocol, and other processing processes. Due to the existence of the first server, the terminal device may use various devices to issue instructions, and the second instruction generated after processing also greatly simplifies the reading process of the second server. It should be understood that the second instruction should be in a data format that can be quickly read by the second server. The second instruction is packed in the data packet format agreed in advance with the second server.

As an example, as an implementation method, the type of the second instruction is marked in the frame header of the second instruction, and the type here includes various types such as parameter modification, production start and stop, etc.; the subject of the modification is marked at the predetermined position of the frame of the second instruction, such as which parameter is modified.

The memory in the second server stores the work order of the production activity at this time. The processor in the second server modifies the work order parameters of the work order according to the second instruction, and the modified content is generated by the processor as a new configuration file delivered to the specific production line device.

In this embodiment, since a unified management platform is adopted, all data calculation processes are directly completed by the management platform, which is very convenient for small enterprises to build the industrial Internet of things (IIoT) for smart manufacturing. Functionally, various data processing functions are realized through the management platform, and there is no need to repeatedly build servers for each smart manufacturing software, which is an architectural innovation.

Similarly, for a unified service platform, terminal devices corresponding to all user platforms are connected to the service platform to unify data, which is also conducive to the construction of the first server and simplifies the data interaction process.

Similarly, for a unified sensor network platform, all the devices and sensors of the object platform interact with data through the same sensor network platform, which is beneficial for uncomplicated production lines and reduces the overall complexity of the system, and improves the efficiency of the system operation.

In some embodiments, the object platform sends the collected production line data to the second server through the sensor network platform to form a production line database.

The first server extracts corresponding data from the production line database and sends it to the terminal device according to a preset rule or a request of the terminal device.

The terminal device displays the received data to the user.

When this embodiment is implemented, based on the characteristics of the smart manufacturing industry, it is different from the previous embodiment, which mainly provides a data downlink, that is, how the instruction sent from the user platform controls the operation of devices of the object platform; in this embodiment, data uplink is implemented. The production line data includes the data detected by the sensor, the quality inspection data of the production product, the production quantity of the production line, etc. These data are collected by the second server, then extracted by the first server, and provided to the user platform to realize the closed-loop of the data flow.

In some embodiments, the second server traverses the production line database in a production process of the object platform, and extracts data of each production link during the production of each product from the production line database as production cycle data of the each product.

The second server establishes a mapping relationship between the production cycle data of the each product and a qualification condition of the each product to form sample data.

The second server uses a support vector machine to classify the sample data to generate a binary classifier; input data of the binary classifier is the production cycle data, and output data of the binary classifier is whether the product is qualified.

When a production cycle of a new product is completed, the second server inputs the production cycle data of the new product into the binary classifier, and determines whether the new product is qualified based on an output result of the binary classifier.

When this embodiment is implemented, since a large amount of production line data is aggregated in the second server to form big data, in order to achieve further intelligent control, this embodiment uses the binary classifier to assist product quality inspection. The production cycle data represents the production conditions experienced by the product during the production process. The inventor found in practice that since the product quality inspection control is a scope control, for many types of products, even in the production cycle data, there are fluctuations or abnormalities in some data, and the product may still be in a qualified state. Therefore, in this embodiment, a method of classifying big data is used to make a preliminary judgment on the qualification of the product. Since the support vector machine (SVM) is a binary algorithm, it is very suitable for judging the qualification of the product. Because there are only two types of qualified products, qualified and unqualified, the binary classifier generated by this algorithm can be directly used for the initial judgment of the qualification of the product. At the same time, the calculation amount of the vector machine is small, and the calculation amount of the dual classifier model is also very suitable for small-scale servers, so it is very suitable for the qualified situation of this embodiment. At the same time, the calculation amount of the support vector machine is small, and the calculation amount of the binary classifier model is also very suitable for small-scale servers, so it is very suitable for the qualification detection in this embodiment.

In some embodiments, the work order parameters are stored in the second server in the form of a parameter table; the parameter table represents corresponding relationships between parameter names and parameter values; the parameter table is configured with correlation relationships between parameters.

When receiving the second instruction, the second server extracts a parameter name of a parameter that needs to be modified from the second instruction, and traverses and retrieves all parameters having the correlation relationships with the parameter from the parameter table according to the parameter name to form an association parameter set;

the second server modifies a parameter in the association parameter set according to a parameter value corresponding to the parameter name in the second instruction, and detects whether a parameter in the association parameter set exceeds a preset value corresponding to the parameter;

if any parameter in the association parameter set is not within a corresponding preset value range, the second server rejects the parameter modification and rolls back the parameter values of the parameters not within the range of the corresponding preset value;

the second server feeds back information data to the terminal device through the first server after rejecting this parameter modification.

When this embodiment is implemented, when modifying the work order parameters, a change in one parameter may bring about changes in a large number of other association parameters. For example, modifying the speed of an assembly line will affect the working cycle of all downstream processing device and the speed of the downstream assembly line. Therefore, in this embodiment, the parameters are associated. When one parameter is modified, the other association parameters are processed together, and the association parameters are monitored after the processing, so as to ensure that each time when a parameter is modified, the production line can continue normal operation, thereby improving product safety.

In some embodiments, if any parameter in the association parameter set is within the corresponding preset value range, the second server modifies the parameter table according to the association parameter set, generates a configuration file, and sends the configuration file to the object platform through the sensor network platform.

Figure 2:
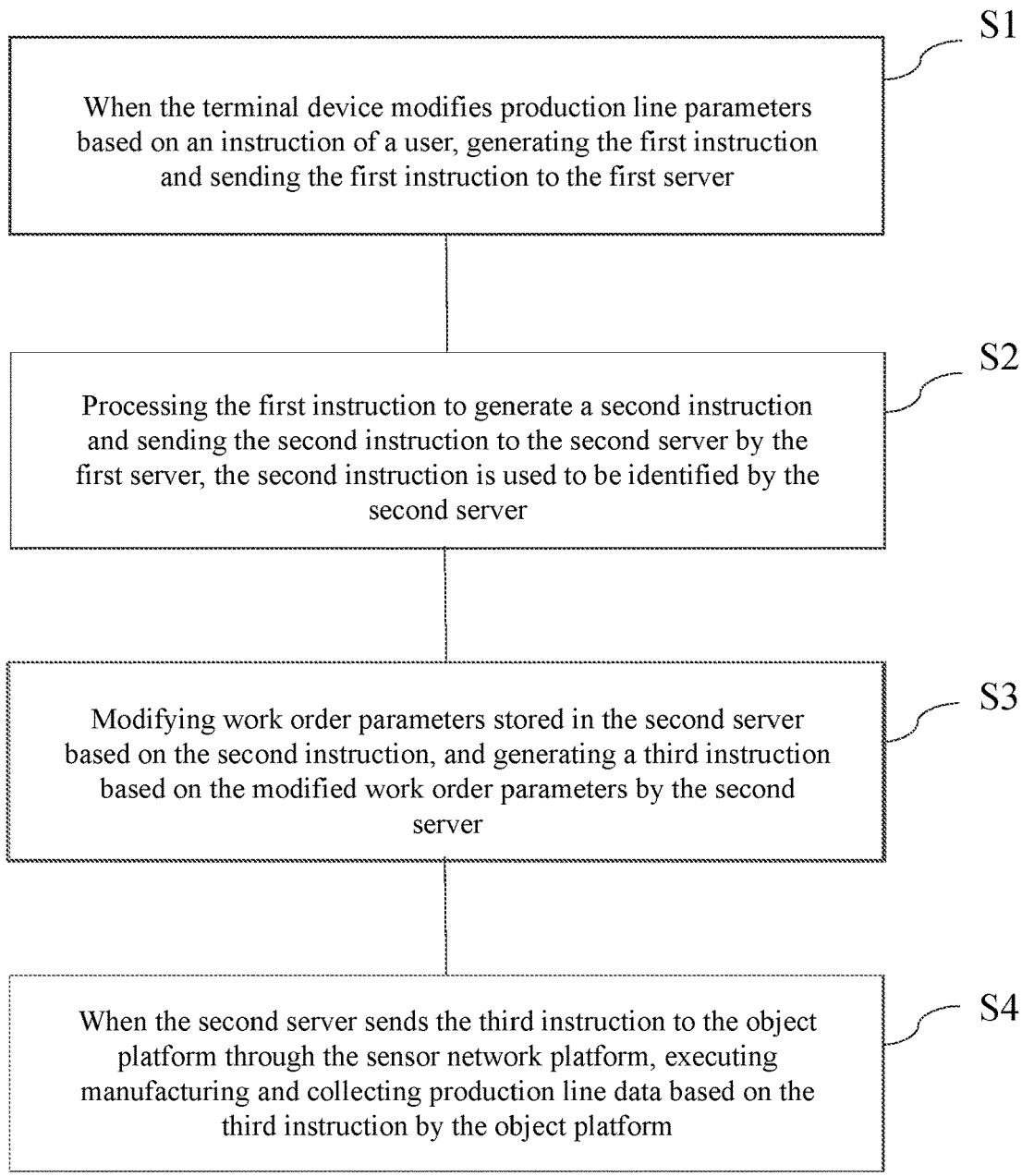
FIG. 2 is a flowchart illustrating an exemplary control method of industrial internet of things (IIoT) for smart manufacturing according to some embodiments of the present disclosure.

Based on the above, please refer to FIG. 2, which is a flowchart illustrating an exemplary control method of industrial internet of things (IIoT) for smart manufacturing according to the embodiment of the present disclosure. The industrial internet of things (IIoT) control method for smart manufacturing can be applied to FIG. 1, the industrial internet of things (IIoT) system for smart manufacturing. Further, the industrial internet of things (IIoT) control method for smart manufacturing may specifically include the content described in the following steps S1-S4.

S1: when the terminal device modifies production line parameters based on an instruction of a user, generating the first instruction and sending the first instruction to the first server;

S2: processing the first instruction to generate a second instruction and sending the second instruction to the second server by the first server, the second instruction is used to be identified by the second server;

S3: modifying work order parameters stored in the second server based on the second instruction, and generating a third instruction based on the modified work order parameters by the second server;

S4: when the second server sends the third instruction to the object platform through the sensor network platform, executing manufacturing and collecting production line data based on the third instruction by the object platform.

In some embodiments, the control method also includes:

sending, by the object platform, the collected production line data to the second server through the sensor network platform to form a production line database;

extracting corresponding data from the production line database and sending it to the terminal device according to a preset rule or a request of the terminal device by the first server;

displaying received data to the user by the terminal device.

In some embodiments, the control method also includes:

traversing the production line database in a production process of the object platform, and extracting data of each production link in the production of each product from the production line database as production cycle data of the each product by the second server;

establishing a mapping relationship between the production cycle data of the each product and a qualification condition of the each product to form sample data by the second server;

using a support vector machine to classify the sample data to generate a binary classifier by the second server; input data of the binary classifier is the production cycle data, and output data of the binary classifier is whether the product is qualified;

when a production cycle of a new product is completed, inputting the production cycle data of the new product into the binary classifier, and determining whether the new product is qualified based on an output result of the binary classifier by the second server.

The binary classifier determined based on the support vector machine can also be recorded as the product qualification determination model. In some embodiments, the product qualification determination model is also implemented by other machine learning models or smart algorithms. For example, a clustering algorithm may be constructed based on the production cycle data as the product qualification determination model, and whether a product is qualified or not can be determined according to the product classification result. For another example, the product qualification determination model may be constructed by a neural network model including a logistic regression module, wherein whether the product is qualified or not can be determined according to the logistic regression result of the product.

It should be noted that the training process of support vector machines and binary classifiers can be separated from actual work. For example, in actual work, the production cycle data can be processed directly based on the trained binary classifier (or dual classifier) to determine whether the product is qualified.

In some embodiments, the work order parameters are stored in the second server in the form of a parameter table; the parameter table represents corresponding relationships between parameter names and parameter values; the parameter table is configured with correlation relationships between parameters.

Modifying work order parameters stored in the second server based on the second instruction by the second server includes:

when receiving the second instruction, extracting a parameter name of a parameter that needs to be modified from the second instruction, and traversing and retrieving all parameters having the correlation relationships with the parameter from the parameter table according to the parameter name to form an association parameter set by the second server;

modifying a parameter in the association parameter set according to a parameter value corresponding to the parameter name in the second instruction, and detecting whether a parameter in the association parameter set exceeds a preset value corresponding to the parameter by the second server;

if any parameter in the association parameter set is not within a corresponding preset value range, rejecting the parameter modification and rolls back the parameter values by the second server;

feeding back information data to the terminal device through the first server after rejecting this parameter modification by the second server.

In some embodiments, modifying work order parameters stored in the second server based on the second instruction by the second server further includes:

if any parameter in the association parameter set is within the corresponding preset value range, modifying the parameter table according to the association parameter set, generating a configuration file, and sending the configuration file to the object platform through the sensor network platform by the second server.

In some embodiments, it is also possible to determine whether device corresponding to the production link is abnormal based on the production link data.

FIG. 3 is a flowchart illustrating an exemplary process for determining whether a device is abnormal according to some embodiments of the present disclosure. Process 300 may be executed by the industrial Internet of things (IIoT) system for smart manufacturing. As shown in FIG. 3, the process 300 may include the following steps:

Step 310: for each production link in the production cycle of the product, collecting production link data of the production link based on a first collection frequency, wherein the production link data includes product data of the production link, device operation parameters, and device monitoring data. In some embodiments, step 310 may be executed by the object platform.

The product in some embodiments of the present disclosure may refer to the finished product output from the production line. For example, when the production line is an industrial product production line, the product may be the final output industrial product. In some embodiments, the product may also include intermediate products or by-products in the production of the product.

In some embodiments of the present disclosure, the production cycle may refer to a process from inputting raw materials or semi-finished of a product into the production line until the finished product is output. In each production cycle, the product maybe processed through multiple production links to obtain the finished product. For example, glass bottle products are obtained by five continuous production links: raw material preprocessing, batch preparation, melting, molding, and heat treatment.

The production link can also be referred to as the production process, the production stage. In some embodiments of the present disclosure, the production link may refer to various processing processes that a product undergoes in a production cycle. For example, the production link can include feeding, rough processing, deep processing, packaging, sub-packaging, etc. For another example, the production link of plastic products may include processing processes such as feeding, plasticizing, injection, pressure holding, cooling, and mold opening and taking out.

In some embodiments, the production of the production line may be periodic. The periodicity of the production line may be related to the batch of products. For example, for a certain batch of products, the complete process of the batch of products from feeding to complete processing is regarded as a cycle of a production line. In some embodiments, the batch of products may be determined according to actual conditions. For example, when products are periodically fed in the production line, the products produced in each feeding cycle can be regarded as one batch of products. For another example, when the products are continuously fed in the production line, the products produced within a preset time can be regarded as one batch of products.

Based on the periodicity of the production line, the production link is also periodic. In some embodiments, the periodicity of each production link can be reflected by the link cycle. A processing process of each batch of products in each production link can be regarded as a link cycle of the production link. For example, for the second batch of glass bottles on Nov. 25, 2025, the processing process of each product in the batch of glass bottles in the melting process can be used as a link cycle in the melting process, and for the third batch of glass bottles on Nov. 25, 2025, the processing process in the melting process can be used as the next link cycle in the melting process.

In some embodiments, the object platform may collect the data of the production links in each link cycle to determine the production link data of each production link. The production link data of each production link may refer to relevant data of a production link in one or more link cycles. For example, the production link data of the production link can reflect the processing status of the batch of products corresponding to the current link cycle in the production link. In some embodiments, production link data may include product data, device operation parameters, device monitoring data, and the like.

The product data may refer to the relevant data of the products actually produced by the production devices included in each production link in the current link cycle. For example, the product data may include the specifications of products or semi-finished products produced in the production link, quality inspection data, product data input into the production link, and the like.

The device operating parameters may refer to the internal working conditions of each device in the production link. In some embodiments, the device operating parameters may be determined by built-in sensors of a device. For example, the device operation parameters may include relevant data such as temperature, pressure, the number of rotations, etc., determined by the built-in sensors of each device when the device is operating.

The device monitoring data may refer to device-related data acquired through sensors of the object platform. For example, the device monitoring data may include the device temperature of the device detected by the temperature sensor, the output pressure value of the device detected by the pressure sensor, and the number of rotations of the device detected by the counter.

In some embodiments, the production link data may be obtained by the sensors of the object platform to monitor, uploaded to the management platform by aggregated through the sensor network platform, and stored in the production line database of the management platform. When invoking the production link data, the second server may traverse the production line database, and extract the relevant data of each production link from the production line database as the corresponding production link data.

In some embodiments, the object platform may acquire the production link data based on the first collection frequency. The first collection frequency may be the number of times that a sensor of the object platform collects the production link data in each link cycle. In some embodiments, the first collection frequency may include the collection frequency of various types of data in the production link data. For example, the first collection frequency may include collection frequencies of product data, device operation parameters, and device monitoring data.

In some cases, when comprehensively judging the relevant status of the production link based on various data of the production link data, it is often necessary to input each parameter of the production link data in a preset format. In some embodiments of the present disclosure, for each parameter of the production link data collected at different frequencies, a collection period may be determined based on the collection frequency, and data statistics may be performed on each parameter of the production link data based on the collection period to determine the input in the subsequent steps (the data sequence of the production link in FIG. 4). The collection period may be determined according to the actual collection frequency of each parameter. For example, the greatest common divisor frequency of the collection frequency may be determined according to the actual collection frequency of each parameter, and the time interval corresponding to the greatest common divisor frequency may be regarded as one collection period. In some embodiments, an average value of each monitoring data in a collection period can be determined by calculating an average number, as a corresponding monitoring data value of the production link in the collection period. For example, in a certain production link, the collection period is 5 minutes. When the device temperature is monitored, the first collection frequency may be preset as 1 time per minute, and the actually collected temperatures are 40 degrees, 42 degrees, 40 degrees, 42 degrees, and 41 degrees, respectively. The average temperature can be calculated as 41 degrees, the average temperature of 41 degrees may be used as the device temperature of the collection period.

In some embodiments, when the actual collection frequency of the parameter is greater than the preset threshold, the collected data may be processed by using a statistical data distribution method. The distribution rules of the data may be determined according to the normal working conditions during actual work. For example, a plurality of range intervals containing monitoring data of normal working conditions may be determined according to production rules. Exemplarily, for the temperature monitoring data of a certain device, based on the production rules of the device, the normal working temperature of the device may be in the interval [40° C., 45° C.], then these three temperature intervals, (30° C., 40° C.), [40° C., 45° C.], (45° C., 75° C.) may be set. Assuming that the collection period is 10 minutes and the actual collection frequency of temperature monitoring data is 1 time per minute, the temperature monitoring data in one collection period may be 35 degrees, 41 degrees, 41 degrees, 55 degrees, 38 degrees, 39 degrees, 43 degrees, 42 degrees, 42 degrees, and 44 degrees. After processing, the data may be expressed as [3, 6, 1], where each parameter represents the number of times a temperature monitoring data falls into the three temperature intervals. Specifically, a temperature monitoring data falls into the interval (30° C., 40° C.) 3 times, the interval [40° C., 45° C.] 6 times, and interval (45° C., 75° C.) 1 time. In some embodiments of the present disclosure, the rule of distribution of the production link data may be determined by obtaining the distribution of statistical data, thereby further determining the abnormal state of the device, avoiding inputting too much data at one time to cause the calculation load too large, and ensuring the accuracy of the abnormal device determination.

Step 320: processing the production link data according to an abnormal determination model to determine whether a device corresponding to the production link is abnormal. In some embodiments, step 320 may be executed by the second server.

Each production link of the production line may correspond to one or more production devices. The production devices may process the raw materials or semi-finished products of the production link to obtain the products of the production link. In some embodiments, the production line may be composed of a plurality of devices with different functions, and when classifying the production links, the production links may be determined according to the functions of the devices. For example, according to the processing process, the cooling function of each device is used as the cooling link, and the devices with the cooling function in the processing sequence may be used as the related devices of the cooling link (devices corresponding to the cooling device).

In some embodiments, the production link data may be analyzed based on the abnormal determination model, so as to determine whether the device corresponding to the production link is abnormal. In some embodiments, the production link data of a certain production link may be the input of the abnormal determination model, and a judgment conclusion of whether the device corresponding to the production link is abnormal may be the output of the abnormal determination model. For example, the production link data of the cooling link may be input into the abnormal determination model, which may output the judgment conclusion of whether there is an abnormality in each device in the cooling link after processing.

In some embodiments, the abnormal determination model may include a production feature extraction layer and an abnormal device determination layer connected in turn. When the abnormal determination model is working, a production link data sequence may be processed through the production feature extraction layer to determine a production feature vector of a device corresponding to the production link. Then, the production feature vector may be processed through the abnormal device determination layer to obtain a judgment conclusion of whether the device corresponding to the production link is abnormal. The production link data sequence may be the production link data including multiple time points extracted from the production line database of the second server. For more details about the internal structure and training method of the abnormal determination model, please refer to the related description of FIG. 4.

Based on the control method of industrial internet of things (IIoT) for smart manufacturing provided by the embodiments of the present disclosure, the relevant data of each production link in the production cycle may be obtained, and the abnormal condition of each device may be determined based on the relevant data, so as to realize the troubleshooting of the devices in each production link in the production line. In some embodiments, the production line may also be repaired or adjusted in time based on the abnormal judgment results in the embodiments of the present disclosure, so as to avoid production problems, thereby ensuring the pass-yield of products.

Figure 4:
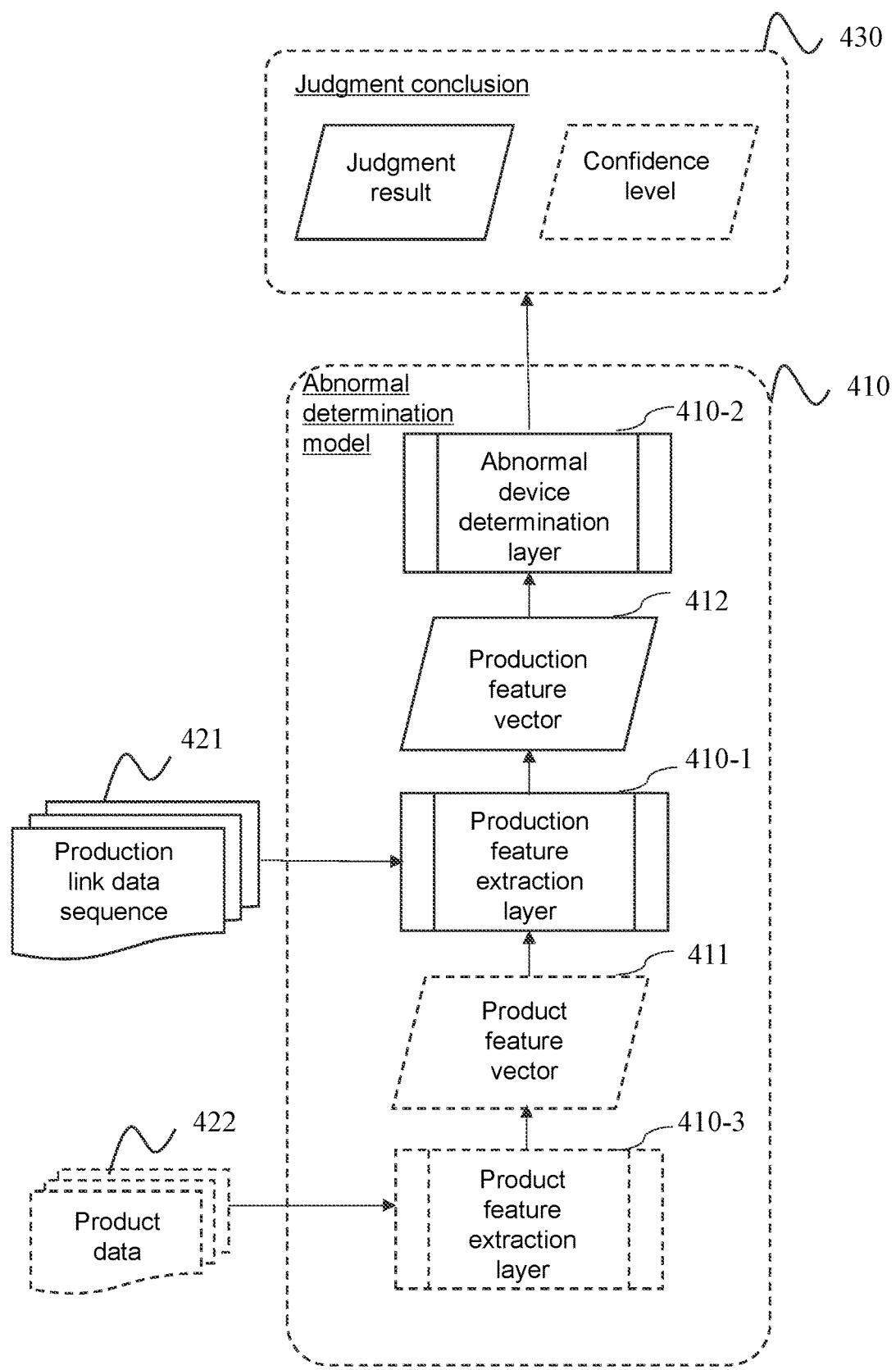
FIG. 4 is a schematic diagram illustrating an exemplary abnormal device determination model according to some embodiments of the present disclosure.

FIG. 4 is a schematic diagram illustrating an exemplary abnormal device determination model according to some embodiments of the present disclosure.

As shown in FIG. 4, the abnormal determination model 410 may include the production feature extraction layer 410-1 and the abnormal device determination layer 410-2 connected in turn. In some embodiments, the production feature extraction layer 410-1 may process the production link data sequence 421 of a certain production link to determine the production feature vector 412 of a device corresponding to the production link. The production feature vector 412 is processed by the abnormal device determination layer 410-2, and a judgment conclusion 430 of whether the device corresponding to the production link is abnormal is obtained. The production link data sequence may include production link data at multiple time points in the collection period. In some embodiments, the production feature extraction layer may be a Long Short-Term Memory (LSTM) network model. In some embodiments, the abnormal device determination layer is a Deep Neural Networks (DNN) model.

The input of the production feature extraction layer may be the production link data (also called the production link data sequence 421 of the link cycle) at each time point in the link cycle (such as the aforementioned collection period), and the output of the production feature extraction layer may be the production feature vector of each production link data.

In some embodiments, the production link data sequence may be determined according to time points when the production link data is collected (time point of production link data collection). The time point of production link data collection may refer to the aforementioned collection period, the production link data sequence may include production link data at multiple time points (such as multiple collection periods), and each production link data may include product data (such as product specifications), device operation parameters, device monitoring data, etc., of the production link.

The production feature vector is vector representation of features of the production link data. In some embodiments, the representation of the production feature vector may be determined according to actual needs and module training requirements. In some embodiments, the production feature vector may describe the abnormal condition of each parameter of the production link data, and its expression form may be whether each parameter meets the preset requirements. For example, the production feature vector may include a probability that the aforementioned device temperature satisfies the normal operation of the device. Exemplarily, the device temperature monitoring value in the production link data sequence may be expressed as [3, 6, 1], and the probability that a temperature is normal of the corresponding production feature vector may be a ratio of the number of times the temperature in the interval [40° C., 45° C.] to the total number of times. For example, the probability is 60%.

In some embodiments, the production feature extraction layer may sequentially process each production link data in the production link data sequence according to the time sequence of data collection. For example, the production link data sequence may be input into the production feature extraction layer in a chronological order. The production feature extraction layer may determine the production feature vector of the production link data currently input based on the production link data currently input and related data of the production link data at other times (such as the production feature vector of the production link data at the previous moment).

The input of the abnormal device determination layer may be the production feature vector of the production link data, and the production feature vector of the production link data is processed to determine a judgment conclusion of whether the device corresponding to the production link is abnormal. The input of the abnormal device determination layer may be the production feature vector of the production link data, and the output of the abnormal device determination layer may be the judgment conclusion of whether the device corresponding to the production link is abnormal. In some embodiments, the production feature vector of the production link data may be input into an input layer of the abnormal device determination layer, the production feature vector of the production link data may be processed through a hidden layer and the output layer may output a judgment conclusion of whether the device corresponding to the production link has an abnormal.

In some embodiments, the judgment conclusion may be used to describe whether devices corresponding to the production link are abnormal. For example, when the production link includes multiple production devices, the judgment conclusion may be presented in the form of a vector, wherein each element in the vector may correspond to each device in the production link, and the element value may indicate whether there is an abnormality in each device. For example, whether there is an abnormality in each device may be represented by a value of 0/1, where 0 indicates that the device is normal and 1 indicates that the device is abnormal. For another example, whether there is an abnormality may be described by an abnormal probability of the device, that is, the corresponding element value may be the abnormal probability. Exemplarily, the judgment conclusion may be (0.5, 0.7, 0.8), wherein each element value is the probability that an abnormality occurs in each of the three devices of the production link.

In some embodiments, the judgment conclusion may include a judgment result. The judgment result represents the judgment result of whether there is an abnormality in each device determined based on the production link data. The judgment result may include that the device corresponding to the production link is normal or the device corresponding to the production link is abnormal. In some embodiments, the judgment result may be determined based on an output vector and preset rule. For example, the output vector is (0.6, 0.7), indicating that the abnormal probability of the first device is 0.6, and the abnormal probability of the second device is 0.7, the preset rule is that when the abnormal probability of certain device is greater than 0.5, it is determined that the device is abnormal, and thus, the judgment conclusion may be that both the first device and the second device are abnormal.

In some embodiments, the judgment conclusion may further include a confidence level of the judgment result. The confidence level can describe the reliability of the corresponding judgment result. In some embodiments, the confidence level of the judgment result may be directly determined based on the abnormal probability in the output vector. For example, if the output vector is (0.6, 0.7), then the judgment conclusion can be that the abnormal confidence level of the first device is 0.6, and the abnormal confidence level of the second device is 0.7. In some embodiments, the confidence level of the judgment result may also be related to the confidence level of the production link data. The confidence level of the production link data of a certain production link data is 0.8, and the output vector is (0.6, 0.7), then the judgment conclusion can be that the abnormal confidence level of the first device is 0.8× 0.6=0.48, and the abnormal confidence level of the second device is 0.8×0.7=0.56.

In some embodiments, an initial production feature extraction layer and an initial abnormal device determination layer may be jointly trained based on historical data to obtain the abnormal determination model. The initial production feature extraction layer and the initial abnormal device determination layer are the production feature extraction layer and the abnormal device determination layer with no parameters set, respectively. In some embodiments, training data of the abnormal determination model may be constructed based on historical data. The historical data may include historical production link data and historical abnormal conditions of each device in the production link corresponding to the historical production link data. The aforementioned historical production link data and the aforementioned historical abnormal conditions may be obtained from the production link of within the historical production cycle of each batch of products.

The training data may include training samples and sample labels. The training samples may be historical production link data, and the sample labels may be historical judgment conclusions corresponding to the historical production link. It should be noted that, when the judgment conclusion only includes the judgment result, the sample label may be determined based on whether the device acquired in the corresponding historical data is abnormal. For example, the sample label may be determined by determining whether the device is abnormal according to the device log based on the historical data and the corresponding training sample may be manually labeled. For another example, historical abnormal conditions of the devices may be determined and labeled according to historical maintenance conditions of the devices. When the judgment conclusion includes the judgment result and the confidence level of the judgment result, the sample label corresponding to the confidence level may be manually labeled according to historical data collection conditions.

In some embodiments, the training samples may be input into the initial production feature extraction layer, the output of the initial production feature extraction layer may be input into the initial abnormal device determination layer, and a loss function may be constructed based on the output of the initial abnormal device determination layer and the sample labels. Based on the loss function, the parameters of the initial production feature extraction layer and the initial abnormal device determination layer are iteratively updated at the same time until the preset conditions are satisfied and the training is completed, and trained production feature extraction layer and the abnormal device determination layer are obtained.

In some embodiments, parameters of internal sub-models or functional layers of the abnormal determination model (e.g., production feature extraction layer, abnormal device determination layer) may be determined along with the training process of the abnormal determination model. Therefore, the parameters of the production feature extraction layer and the abnormal device determination layer may be obtained through the above training method. It is beneficial to solve the problem of difficulty in obtaining labels when training the production feature extraction layer alone in some cases. In addition, the production feature extraction layer may better obtain features that reflect the production link data sequence.

Some embodiments of the present disclosure may also adjust the first collection frequency of data based on the confidence level. Details as follows:

In some embodiments, the confidence level of the judgment result may be judged, and when the confidence level of the judgment result is less than a threshold, the first collection frequency is adjusted to obtain a second collection frequency. The second collection frequency is higher than the first collection frequency. The second collection frequency may be a data collection frequency adopted to strengthen the monitoring of the device when the device may be abnormal. For example, if the confidence level of the judgment result is 0.7, the threshold is 0.75, and the first collection frequency is 10 times/min, the first collection frequency may be increased to the second collection frequency.

In some embodiments, the specific value of the second collection frequency may be determined according to the confidence level requirement of the judgment result.

In some embodiments, the collection frequency of production link data is positively correlated with the confidence level of the production link data. The greater the collection frequency of production link data, the higher the confidence level of the production link data; The smaller the collection frequency of production link data, the lower the confidence level of the production link data. The collection frequency and the confidence level of the production link data may be determined according to preset corresponding rules. For example, the second server may be preset with a first frequency threshold of 6 times/min and a second frequency threshold of 10 times/min. When the collection frequency is less than or equal to the first frequency threshold, the confidence level of the corresponding production link data is 0.6. When the collection frequency is greater than the first frequency threshold and less than the second frequency threshold, the confidence level of the corresponding production link data is 0.8. When the collection frequency is greater than or equal to the second frequency threshold, the confidence level of the corresponding production link data is 1.

It should be understood that when the analysis is performed based on less production link data, due to the small amount of data, the obtained judgment result is not accurate enough, and the confidence level is low. Therefore, the collection frequency of production link data may be increased, and more production link data may be analyzed and processed, thereby obtaining more accurate judgment results and making the judgment results with higher confidence level.

In some embodiments, the collection frequency of production link data may also be used as the input of the abnormal determination model (e.g., the production feature extraction layer), so that the abnormal determination model may directly determine the confidence level of the judgment result according to the data collection frequency (the collection frequency of production link data).

In some embodiments, the confidence level may also be determined according to the data on which the judgment result depends. In some embodiments, the confidence level may be related to the current moment and the previous judgment conclusion. For example, when the judgment conclusion at the current moment is different from the judgment conclusion at the previous moment, the confidence level at the moment when the judgment conclusion changes may be lower. When the judgment conclusion at the current moment is the same as the judgment conclusion at the previous moment, the confidence level at the moment when the judgment conclusion changes may be higher. In some embodiments, the confidence level may be comprehensively judged according to various judgment factors. For example, the confidence level may be determined based on the weighted results of various factors. Exemplarily, the confidence level $P=\alpha A+\beta B+\gamma$. A may be the difference between the judgment conclusion at the current moment and the judgment conclusion at the previous moment, B may be the data collection frequency, and $\alpha$, $\beta$, and $\gamma$ may be preset parameters.

As shown in FIG. 4, the abnormal determination model 410 may further include the product feature extraction layer 410-3. The product feature extraction layer 410-3 may be used to process the product data 422 to generate a product feature vector 411. The input of the product feature extraction layer is product data, and the output is the product feature vector.

In some embodiments, the product data may refer to the relevant data of the product (data relating to the product) in the production link. The specific content of the product data may be determined and adjusted according to the actual needs of the product feature vector. For example, when the product feature vector is used to determine the monitoring data required in the production link, the product data may include but is not limited to the raw materials of the product, the production specifications of the product, the processing duration (or processing technology) of the product in this production link, and the processing duration (or processing technology) of the product in the previous production link, or other product-related information. For another example, when the product feature vector is used to input to the production feature extraction layer to improve the accuracy of the abnormal determination model, the product data may include but is not limited to the processing conditions of the product in the previous production link (such as the pass rate, processed product form, etc.).

The product feature vector may describe the impact of the product itself on the production link. In some embodiments, product feature vectors may include the morphological characteristics and process characteristics of the product in the production link. In some embodiments, the product feature vector may include morphological features of the product in the production link, process features of the product in the production link, etc. Exemplarily, when different products start to be processed at each production link, the initial forms of the product (such as the material, shape, and size of the product) are different, and its changes in the subsequent production process are different, correspondingly, the product feature vector may include the form change of the product in this production link and the reasons for the form change (the product processing process of this link). In some embodiments, a specific monitoring method and corresponding monitoring data of the production link may be determined according to the product form change and the product processing processes.

In some embodiments, the product feature vector may include product features of the current link. When the product feature vector including the product features of the current link is input into the production feature extraction layer, the production feature extraction layer may improve the processing of the production link data based on the product features that should be produced in the current production link, thereby improving the accuracy of the judgment conclusion.

In some embodiments, the product feature vector may further include product features processed in the previous production link of the current link. For example, the product feature vector may include a qualified product rate of the previous production link. Considering that the products of the previous production link are used as raw materials in the current production link. When the product feature vector including the product features of the previous production link is input into the production feature extraction layer, the production feature extraction layer may improve the judgment conclusion based on the production conditions of the previous production link, thereby improving the accuracy of the judgment conclusion.

In some embodiments, the product feature extraction layer may be the LSTM. In some embodiments, the product data input by the product feature extraction layer may be product-related data collected at each collection time point (e.g., each collection period) in the link cycle. The product feature extraction layer may determine the product feature vector at the current time point according to the product data at the current collection time point and the related data of the product data at other time points (e.g., the product feature vector at the previous moment). Exemplarily, the product feature vector at the current moment may be determined according to the product data at the current moment and the product feature vector at the previous moment.

In some embodiments, sub-models of the abnormal determination model may be obtained through separate training. During the training process of the abnormal determination model, the parameters of the trained sub-model do not change with the training. For example, the product feature extraction layer may be trained separately, and the trained product feature extraction layer may be loaded into the abnormal determination model.

In some embodiments, at least one initial product feature extraction layer may be connected with other functional modules to construct an overall training model, and parameters of the product feature extraction layer may be determined by jointly training the overall training model.

In some embodiments, the overall training model may be constructed as an initial product comparison model. The initial product comparison model may be an initial training model of a product comparison model. The product comparison model may include the product feature extraction layer, another product feature extraction layer, and a product judgment layer. In some embodiments, the product judgment layer may be DNN models. The product judgment layer may determine whether the two products are the same product based on the product feature vectors of the two products. For example, the product judgment layer may determine whether two products are the same product based on the Euclidean distance of the feature vectors of the two products. Correspondingly, the initial product comparison model may include the initial product feature extraction layer, another initial product feature extraction layer, and an initial product judgment layer. The initial product feature extraction layer and another initial product feature extraction layer may be product feature extraction layers with shared parameters and no parameters set. In some embodiments, the initial product feature extraction layer and another initial product feature extraction layer may process product data of the same or different products, respectively, to determine corresponding product feature vectors and input the product feature vectors to the product judgment layer.

In some embodiments, the training data of the initial product comparison model may include historical product data of multiple products. During training, the historical product data of two products may be randomly selected from the training data as training samples, and training labels may be determined according to whether the two products are the same product. The historical product data of two randomly selected products may be input into the initial product feature extraction layer and another initial product feature extraction layer respectively, so as to obtain a first historical product feature vector output by the initial product feature extraction layer and a second historical product feature vector output by another initial product feature extraction layer. The first historical product feature vector and the second historical product feature vector are input into the initial product judgment layer, and a historical judgment result is obtained based on the Euclidean distance of the two product feature vectors. The loss function is built according to the historical judgment results and the training labels, and the parameters of the initial product feature extraction layer, another initial product feature extraction layer and the initial product judgment layer are iteratively updated based on the loss function, until the preset conditions are satisfied and the training is completed. A trained product comparison model is obtained, the parameters of the product feature extraction layer of the product comparison model after the training is completed may also be determined.

In some embodiments, the overall training model may be constructed as an initial product identification model. The initial product identification model may be an initial training model of a product identification model. The product identification model may include the product feature extraction layer and a product identification layer. In some embodiments, the product feature extraction layer may determine the corresponding product feature vector according to the input product data and input the corresponding product feature vector to the product identification layer. The product identification layer may be a DNN model, and the product identification layer may identify the type of the product according to the input product feature vector. Correspondingly, the initial product identification model may include the initial product feature extraction layer and an initial product identification layer. The initial product feature extraction layer may be a product feature extraction layer whose parameters are not set.

In some embodiments, the training data of the initial product identification model may include the historical product data of multiple products and corresponding product types. The training samples may be the historical product data of products, and the sample labels may be the corresponding product types. The training samples may be input into the initial product feature extraction layer to obtain the historical product feature vector, and the historical product feature vector is processed by the initial product identification layer to determine a historical identification result of the product type. And a loss function is built based on the historical identification result and the sample labels, and the parameters of the initial product feature extraction layer and the initial product recognition layer are iteratively updated based on the loss function, until the preset conditions are satisfied and the training is completed. A trained product identification model is obtained, and the parameters of the product feature extraction layer of the product identification model may also be determined.

Based on the control method of the industrial internet of things (IIoT) for the smart manufacturing provided by the embodiments of the present disclosure, the abnormal determination result of a device may be determined through a machine learning model. In the judgment process, the production link data at multiple time points in the production cycle is introduced, thereby improving the accuracy of the judgment result. In addition, the embodiments of the present disclosure also introduce the confidence level of the judgment result, thereby improving the accuracy of the judgment and preventing the wrong judgment result caused by data fluctuation from affecting the production of the entire production line.

Those of ordinary skill in the art can realize that the units and algorithm steps of each example described in conjunction with the embodiments disclosed herein can be implemented in electronic hardware, computer software, or a combination of the two. In order to clearly illustrate the interchangeability of hardware and software, the components and steps of each example have been generally described in terms of functions in the foregoing description. Whether these functions are performed in hardware or software depends on the specific application and design constraints of the technical solution. Skilled artisans may implement the described functionality using different methods for each particular application, but such implementations should not be considered beyond the scope of the present disclosure.

In some embodiments of this specification, it should be understood that the disclosed apparatus and method may be implemented in other manners. For example, the apparatus embodiments described above are merely illustrative. For example, the division of the units is only a logical function division, and other division methods may be used in actual implementation. For example, multiple units or components may be combined or may be integrated into another system, or some features may be omitted, or not implemented. In addition, the shown or discussed mutual coupling or direct coupling or communication connection may be indirect coupling or communication connection through some interfaces, devices or units, and may also be electrical, mechanical or other forms of connection.

The units described as separate parts may or may not be physically separate. As a unit, it is obvious to those skilled in the art that the units and algorithm steps of each example described in conjunction with the embodiments disclosed herein can be implemented by electronic hardware, computer software or a combination of the two. In order to clearly illustrate the interchangeability of hardware and software, the components and steps of each example have been generally described in terms of functions in the foregoing description. Whether these functions are performed in hardware or software depends on the specific application and design constraints of the technical solution. Skilled artisans may implement the described functionality using different methods for each particular application, but such implementations should not be considered beyond the scope of the present invention.

In addition, each functional unit in each embodiment of the present invention may be integrated into one processing unit, or each unit may exist physically alone, or two or more units may be integrated into one unit. The above-mentioned integrated units may be implemented in the form of hardware, or may be implemented in the form of software functional units.

The integrated unit, if implemented in the form of a software functional unit and sold or used as an independent product, may be stored in a computer-readable storage medium. Based on this understanding, the technical solutions of the present disclosure are essentially or parts that contribute to the prior art, or all or part of the technical solutions can be embodied in the form of software products. The computer software product is stored in a storage medium, and includes several instructions for causing a computer device (which may be a personal computer, a server, or a grid device, etc.) to execute all or part of the steps of the methods described in various embodiments of the present invention. The aforementioned storage medium includes: U disk, removable hard disk, read-only memory (Read-Only Memory, ROM), random access memory (Random Access Memory, RAM), magnetic disk or optical disk and other media that can store program codes.

The specific embodiments described above further describe the objectives, technical solutions and beneficial effects of the present invention in detail. It should be understood that the above descriptions are only specific embodiments of the present invention, and are not intended to limit the protection scope of the present disclosure. Any modification, equivalent replacement, improvement, etc. made within the spirit and principle of the present invention shall be included within the protection scope of the present disclosure.

What is claimed is:

1. An industrial internet of things (IIoT) system for smart manufacturing, comprising: a user platform, a service platform, a management platform, a sensor network platform, and an object platform that interact in turn; wherein
   the user platform is configured as a terminal device, and interacts with a user;
   the service platform is configured as a first server, receives instructions from the user platform and sends the instructions to the management platform, extracts information required by the user platform from the management platform, processes the information, and sends the information to the user platform;
   the management platform is configured as a second server, controls the operation of the object platform, and receives feedback data from the object platform;
   the sensor network platform is configured as a communication network and a gateway, through which the object platform and the management platform interact;
   the object platform is configured as production line devices and production line sensors that perform manufacturing; wherein
   the service platform, the management platform, and the sensor network platform all use centralized layouts, the centralized layouts mean that any platform uniformly receives data, uniformly processes data, and uniformly sends data;
   when the terminal device modifies production line parameters based on an instruction of the user, the terminal device generates a first instruction and sends the first instruction to the first server;
   the first server processes the first instruction to generate a second instruction and sends the second instruction to the second server, the second instruction being used to be identified by the second server;
   the second server modifies work order parameters stored in the second server based on the second instruction, and generates a third instruction based on the modified work order parameters;
   when the second server sends the third instruction to the object platform through the sensor network platform, the object platform executes manufacturing and collects production line data based on the third instruction;
   the object platform sends the collected production line data to the second server through the sensor network platform to form a production line database;
   the first server extracts corresponding data from the production line database and sends the data to the terminal device according to a preset rule or a request of the terminal device; and
   the terminal device displays the received data to the user; and the second server traverses the production line database in a production process of the object platform, and extracts data of each production link during the production of each product from the production line database as production cycle data of the each product;

the second server establishes a mapping relationship between the production cycle data of the each product and a qualification condition of the each product to form sample data;

the second server uses a support vector machine to classify the sample data to generate a binary classifier; input data of the binary classifier is the production cycle data, and output data of the binary classifier is whether the product is qualified; and when a production cycle of a new product is completed, the second server inputs production cycle data of the new product into the binary classifier, and determines whether the new product is qualified based on an output result of the binary classifier.

2. The IIoT system according to claim 1, wherein the work order parameters are stored in the second server in the form of a parameter table; the parameter table represents corresponding relationships between parameter names and parameter values; the parameter table is configured with correlation relationships between parameters;

when receiving the second instruction, the second server extracts a parameter name of a parameter that needs to be modified from the second instruction, and traverses and retrieves all parameters having the correlation relationships with the parameter from the parameter table according to the parameter name to form an association parameter set;

the second server modifies a parameter in the association parameter set according to a parameter value corresponding to the parameter name in the second instruction, and detects whether a parameter in the association parameter set exceeds a corresponding preset value;

if any parameter in the association parameter set is not within a range of the corresponding preset value, the second server rejects this parameter modification and rolls back a parameter value of any parameter not within the range of the corresponding preset value; and the second server feeds back information data to the terminal device through the first server after rejecting this parameter modification; or if any parameter in the association parameter set is within the range of the corresponding preset value, the second server modifies the parameter table according to the association parameter set, generates a configuration file, and sends the configuration file to the object platform through the sensor network platform.

3. The IIoT system according to claim 1, wherein for each production link in a production cycle of the product, the object platform is also configured to:

collect production link data of the production link based on a first collection frequency, wherein the production link data includes product data of the production link, device operation parameters, and device monitoring data;

the second server is also configured to:

process the production link data according to an abnormal determination model to determine whether a device corresponding to the production link is abnormal;

the abnormal determination model includes a production feature extraction layer and an abnormal device determination layer connected in turn, and the second server is also configured to:

process a production link data sequence through the production feature extraction layer to determine a production feature vector of the device corresponding to the production link, and the production link data sequence includes the production link data at multiple time points; and process the production feature vector through the abnormal device determination layer to obtain a judgment conclusion of whether the device corresponding to the production link is abnormal.

4. The IIoT system according to claim 3, wherein the judgment conclusion includes a judgment result of whether the device corresponding to the production link is abnormal and a confidence level of the judgment result, and when the confidence level is less than a threshold, the second server is also configured to:

adjust the first collection frequency of the object platform to a second collection frequency, and the second collection frequency is higher than the first collection frequency.

5. A control method of industrial internet of things (IIoT) for smart manufacturing, which is applied to a user platform, a service platform, a management platform, a sensor network platform, and an object platform that interact in turn; wherein the user platform is configured as a terminal device, and interacts with a user;

the service platform is configured as a first server, receives instructions from the user platform and sends the instructions to the management platform, extracts information required by the user platform from the management platform, processes the information, and sends the information to the user platform;

the management platform is configured as a second server, controls the operation of the object platform, and receives feedback data from the object platform;

the sensor network platform is configured as a communication network and a gateway, through which the object platform and the management platform interact;

the object platform is configured as production line device and production line sensors that perform manufacturing; wherein the service platform, the management platform, and the sensor network platform all use centralized layouts; the centralized layouts mean that any platform uniformly receives data, uniformly processes data, and uniformly sends data;

the control method comprising:

when the terminal device modifies production line parameters based on an instruction of the user, generating, by the terminal device, a first instruction and sending the first instruction to the first server;

processing the first instruction to generate a second instruction and sending the second instruction to the second server by the first server, the second instruction being used to be identified by the second server;

modifying work order parameters stored in the second server based on the second instruction, and generating a third instruction based on the modified work order parameters by the second server; and when the second server sends the third instruction to the object platform through the sensor network platform, executing manufacturing and collecting production line data based on the third instruction by the object platform;

the method further comprising:

sending, by the object platform, the collected production line data to the second server through the sensor network platform to form a production line database;

extracting corresponding data from the production line database and sending the data to the terminal device according to a preset rule or a request of the terminal device by the first server; and displaying the received data to the user by the terminal device; and the method further comprising:

traversing the production line database in a production process of the object platform, and extracting data of each production link during the production of each product from the production line database as production cycle data of the each product by the second server;

establishing a mapping relationship between the production cycle data of the each product and a qualification condition of the each product to form sample data by the second server;

using, by the second server, a support vector machine to classify the sample data to generate a binary classifier; input data of the binary classifier is the production cycle data, and output data of the binary classifier is whether the product is qualified; and when a production cycle of a new product is completed, inputting production cycle data of the new product into the binary classifier, and determining whether the new product is qualified based on an output result of the binary classifier by the second server.

6. The control method according to claim 5, wherein the work order parameters are stored in the second server in the form of a parameter table; the parameter table represents corresponding relationships between parameter names and parameter values; the parameter table is configured with correlation relationships between parameters; and the modifying work order parameters stored in the second server based on the second instruction by the second server, includes:

when receiving the second instruction, extracting a parameter name of a parameter that needs to be modified from the second instruction, and traversing and retrieving all parameters having the correlation relationships with the parameter from the parameter table according to the parameter name to form an association parameter set by the second server;

modifying a parameter in the association parameter set according to a parameter value corresponding to the parameter name in the second instruction, and detecting whether a parameter in the association parameter set exceeds a corresponding preset value by the second server;

if any parameter in the association parameter set is not within a range of the corresponding preset value, rejecting this parameter modification and rolls back a parameter value of any parameter not within the range of the corresponding preset value by the second server; and feeding back information data to the terminal device through the first server after rejecting this parameter modification by the second server; wherein the modifying work order parameters stored in the second server based on the second instruction by the second server further includes:

if any parameter in the association parameter set is within the range of the corresponding preset value, modifying the parameter table according to the association parameter set, generating a configuration file, and sending the configuration file to the object platform through the sensor network platform by the second server.

7. The control method according to claim 5, further comprising:

for each production link in a production cycle of the product, collecting production link data of the production link based on a first collection frequency by the object platform, wherein the production link data includes product data of the production link, device operation parameters, and device monitoring data; and processing the production link data according to an abnormal determination model to determine whether a device corresponding to the production link is abnormal by the second server; wherein the abnormal determination model includes a production feature extraction layer and an abnormal device determination layer connected in turn, and the processing the production link data according to the abnormal determination model to determine whether the device corresponding to the production link is abnormal by the second server includes:

processing a production link data sequence through the production feature extraction layer to determine a production feature vector of the device corresponding to the production link, and the production link data sequence includes the production link data at multiple time points; and processing the production feature vector through the abnormal device determination layer to obtain a judgment conclusion of whether the device corresponding to the production link is abnormal.

8. The control method according to claim 7, wherein the judgment conclusion includes a judgment result of whether the device corresponding to the production link is abnormal and a confidence level of the judgment result, and the control method further comprises:

when the confidence level is less than a threshold, adjusting the first collection frequency of the object platform to a second collection frequency by the second server, wherein the second collection frequency is higher than the first collection frequency.

\* \* \* \* \*